United States Patent [19]

Zhu

[11] Patent Number: 5,889,083
[45] Date of Patent: Mar. 30, 1999

[54] AQUEOUS JET INK COMPOSITIONS

[75] Inventor: Linfang Zhu, Naperville, Ill.

[73] Assignee: Videojet Systems International, Inc., Wood Dale, Ill.

[21] Appl. No.: 709,390

[22] Filed: Sep. 6, 1996

[51] Int. Cl.$^6$ .................................................. C09D 5/00
[52] U.S. Cl. ........................... 523/161; 524/275; 524/462
[58] Field of Search ............................ 523/161; 524/275, 524/462

[56] References Cited

U.S. PATENT DOCUMENTS

| | | | |
|---|---|---|---|
| 3,060,429 | 10/1962 | Winston | 346/1 |
| 3,298,030 | 1/1967 | Lewis et al. | 346/75 |
| 3,373,437 | 3/1968 | Sweet et al. | 346/75 |
| 3,416,153 | 12/1968 | Hertz et al. | 346/75 |
| 3,673,601 | 6/1972 | Hertz | 346/75 |
| 3,687,887 | 8/1972 | Zabiak | 260/29.6 |
| 4,465,800 | 8/1984 | Bhatia | 524/236 |
| 4,567,213 | 1/1986 | Bhatia et al. | 523/160 |
| 4,684,946 | 8/1987 | Ball | 346/1.1 |
| 5,080,716 | 1/1992 | Aoki et al. | 106/20 |
| 5,207,825 | 5/1993 | Schwartz, Jr. | 106/22 R |
| 5,254,158 | 10/1993 | Breton et al. | 106/20 R |
| 5,316,575 | 5/1994 | Lent et al. | 106/20 R |
| 5,345,254 | 9/1994 | Wong et al. | 347/100 |

FOREIGN PATENT DOCUMENTS

| | | |
|---|---|---|
| 4356570 | 12/1992 | Japan . |
| 4370166 | 12/1992 | Japan . |
| 6200199 | 7/1994 | Japan . |
| 6220376 | 8/1994 | Japan . |

OTHER PUBLICATIONS

Kuhn et al., *Scientific America*, April 1979, pp. 162–168, 171–175.

Keeling, *Ink Jet Printing, Phys Technol*, 12, 196–203 (1981).

Cotton, *Waxes, Kirk–Othmer Encycl. Chem. Tech.*, 25, 614–626 4$^{th}$ Ed. (1998).

Friberg et al. *Emulsions Kirk–Othmer Encycl. Chem. Tech.*, 9, 393–413 4$^{th}$ Ed. (1998).

International Search Report–PCT/GB97/02389, dated Jan. 29, 1998.

*Primary Examiner*—Edward J. Cain
*Attorney, Agent, or Firm*—Leydig, Voit & Mayer, Ltd.

[57] ABSTRACT

Disclosed is an aqueous jet ink composition suitable for printing scratch and rub resistant identifying marks on substrates such as paper, glass, metal, or plastic substrates comprising water, a colorant, a binder resin, and a wax. An example of the colorant is carbon black. An example of the binder resin is a styrene-acrylic copolymer. An example of a suitable wax is a polyethylene or a polytetrafluoroethylene wax. The jet ink composition may further contain organic solvents, defoamers, conductivity agents, and biocides. Also disclosed are a process for preparing the jet ink composition and a process for producing identifying marks on the substrates.

66 Claims, No Drawings

AQUEOUS JET INK COMPOSITIONS

TECHNICAL FIELD OF THE INVENTION

The present invention generally relates to aqueous ink jet printing ink compositions, and particularly to aqueous jet ink compositions suitable for printing on substrates such as glass, plastic, and metal images that are scratch and rub resistant.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream electronically so that the droplets are caused to form the desired printed image on that surface. This technique of noncontact printing is well suited for application of characters onto a variety of surfaces including porous and non-porous surfaces.

Reviews of various aspects of ink jet printing can be found in these publications: Kuhn et al., *Scientific American*, April, 1979, 162–178; and Keeling, *Phys. Technol.*, 12(5), 196–303 (1981). Various ink jet apparatuses are described in the following U.S. Pat. Nos. 3,060,429, 3,298,030, 3,373,437, 3,416,153, and 3,673,601.

In general, an ink jet composition must meet certain rigid requirements to be useful in ink jet printing operations. These relate to viscosity, resistivity, solubility, compatibility of components and wettability of the substrate. Further, the ink must be quick-drying and smear resistant, must be capable of passing through the ink jet nozzle without clogging, and must permit rapid cleanup of the machine components with minimum effort.

Water-based or aqueous jet inks have been in particular demand so that industry can meet the low VOC regulations and improve work place and environmental safety. Several aqueous jet ink compositions have been disclosed in the patent literature. For example, U.S. Pat. No. 5,207,825 discloses a jet ink composition which comprises an aqueous liquid vehicle, a colorant, and a polymeric additive which is a substituted bisphenol A derivative.

U.S. Pat. No. 5,080,716 discloses a jet ink composition comprising a recording agent, a liquid medium capable of dissolving or dispersing the recording agent, and a substituted benzene or toluene sulfonamide compound.

U.S. Pat. No. 5,254,158 discloses an ink composition which comprises an aqueous liquid vehicle, a colorant, and an additive selected from the group consisting of amine alkoxylates, sorbitan monoester alkoxylates, alkylene oxide adducts of glycerin, and mixtures thereof.

U.S. Pat. No. 5,316,575, having the same assignee as the present application, discloses an ink composition suitable for ink jet printing, comprising an aqueous resin solution and an organic pigment, wherein said ink composition is substantially free of volatile organic compounds.

U.S. Pat. No. 5,345,254 discloses a jet ink composition which is an emulsion or suspension of an organic phase in a water phase, the organic phase including at least one of oil and wax. In one embodiment, the organic phase is said to contain a colorant which may be a pigment or oil soluble dye, and at least one of oil and wax. When certain embodiments of this invention are employed in jet printing, the jet nozzle requires heating to prevent clogging by the wax particles.

U.S. Pat. No. 3,687,887 discloses an aqueous jet ink composition suitable for titling of film or photographic negatives, which is an aqueous system containing a dissolved styrene-maleic anhydride or polyvinyl acetate resin, glycol ethers, carbon black, and certain other additives.

Some of the previously known aqueous jet inks have certain drawbacks such as long drying times, poor adhesion to substrates as shown, for example, by poor finger nail scratch resistance and finger rub resistance, and poor wet adhesion, water fastness, and print quality. Various approaches have been proposed to overcome these drawbacks. For example, the drying time can be greatly reduced through the use of a drying device such as an air knife or an IR lamp. Further, water fastness can be improved by the use of pigments instead of dyes. However, it has been a great challenge to develop a water based jet ink that offers images having good rub and scratch resistance when printed on substrates such as glass, metal, and plastics, and particularly when printed on non-polar substrates such as polyolefins including halogenated polyolefins which are the most difficult substrates to print on.

Thus, there exists a need for aqueous jet ink compositions that can meet the low VOC regulations. There further exists a need for aqueous jet ink compositions that offer improved water fastness and improved adhesion to substrates. There also exists a need for aqueous jet ink compositions that offer images having good rub and scratch resistance such as finger nail scratch resistance and finger rub resistance, particularly when printed on non-polar substrates such as polyethylene, polypropylene, and tetrafluoroethylene.

These and other objects of the present invention will be apparent from the detailed description of the preferred embodiments of the invention set forth below.

SUMMARY OF THE INVENTION

The foregoing needs have been fulfilled to a great extent by the present invention which provides an aqueous jet ink composition having improved finger nail scratch resistance, finger rub resistance, and improved safety.

The ink composition of the present invention comprises water, a colorant, a binder resin, and a wax. Additional ingredients such as organic solvents, humectants, and biocides can be present in the jet ink composition in order to improve the solubility or the dispersibility of the binder resin, the wax, and the colorant, and to improve the shelf life.

The present invention also provides a method of forming printed images on porous and non-porous surfaces using the ink composition of the present invention. In accordance with the invention, the method comprises projecting a stream of droplets of the ink composition onto a surface and controlling the direction of the stream electronically so that the ink droplets form the desired printed image on the surface.

The present invention further provides a method of preparing the inventive jet ink composition comprising combining and mixing water, a colorant, a binder resin, and a wax.

While the invention has been described and disclosed below in connection with certain prepared embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention provides aqueous jet ink compositions suitable for printing on substrates such as paper, glass, metals, ceramics, and plastics images that have excellent adhesion, as shown, for example, by improved finger nail scratch resistance and finger rub resistance.

The present invention provides a jet ink composition comprising water, a colorant, a binder resin, and a wax.

GENERAL PROPERTIES

In general, the ink compositions of the present invention exhibit the following characteristics for use in ink jet printing systems: (1) a viscosity of from about 1.6 to about 7.0 centipoises (cps) at 25° C.; (2) an electrical resistivity of from about 50 to about 2000 ohm-cm; and (3) a sonic velocity of from about 1100 to about 1500 meters/second.

A detailed discussion of the ingredients and the characteristics of the inventive ink composition is set forth below.

INK CARRIER

Water is used as the ink carrier for the aqueous jet ink composition of the present invention. Typically water is present in an amount of from about 40% weight to about 80% by weight, preferably from about 50% by weight to about 70% by weight of the composition. In order to prevent the clogging of ink jet tip by dissolved salts in the water, deionized water is preferably used in the preparation of the ink composition.

COLORANTS

The ink composition comprises one or more colorants that impart the desired color to the printed message. Any dye, pigment, or lake that may be dissolved or dispersed in the ink composition can be used.

Carbon black is a preferred colorant for use in the ink compositions of the instant invention. Carbon black colorant includes Channel black, furnace black, and lamp black. Other examples of suitable pigments include pigments such as titanium dioxide-anatase and rutile, zinc oxide, zinc sulfide, and lithopone which are also hiding pigments.

Further examples of suitable pigments include Metallized Azo Reds such as Red 49:1 (Barium salt), Red 49:2 (Calcium salt), Red 63:1 (Calcium salt), Toluidine Reds, Naphthol Reds, Pyrazalones, Rhodamines, Quinacridones such as Red B, Red Y, Magenta B, Magenta and Violet, Phthalocyanine Blues, Phthalocyanine Greens, Carbazole Yellow, Monoarylide Yellow, Diarylide Yellow, Chrome Yellow, Red Lake C, Lithol Reds such as calcium and barium salts, Lithol Rubine, Bon Maroon, Perylene pigments, Red 2B pigments including the calcium, barium and magnesium salts, Chrome yellow, Chrome Orange, Molybdate Orange, Lead Chromes, Lead Silicochromates, Zinc Chromes, barium chromate, strontium chromate, titanium nickel yellow, Liminites, Haematite, Magnetite, Micaceous Oxides of Iron, Siderite, Iron Pyrites, Ferrite Yellow, Red Oxide, Prussian Blue, Orange 36, Diarylide Orange, Dianisidine Orange, Tolyl Orange, and Dinitraniline Orange. Other suitable examples of pigments include lakes, for instance, lakes formed from acid dyes and alkali or alkaline earth metals. Examples of acid dyes suitable for forming such lakes include Peacock Blue, Scarlet 2R, Azo Bordeaux, Pigment Scarlet 3B, Orange 2, and Tartrazine.

Examples of dyes suitable for use in the preparation of the ink composition of the present invention include, but are not limited to, the yellow dyes such as C.I. Solvent Yellow 19 (C.I. 13900A), C.I. Solvent Yellow 21 (C.I. 18690), C.I. Solvent Yellow 61, C.I. Solvent Yellow 80, FD&C Yellow #5, Yellow Shade 16948, Acid Yellow 23, Levaderm Lemon Yellow (Mobay), Spirit Fast Yellow 3G, Aizen Spilon Yellow C-GNH (Hodagaya Chemical Co.), Pergasol Yellow CGP (Ciba-Geigy), and the like, the orange dyes such as C.I. Solvent Orange 1 (C.I. 11920), C.I. Orange 37, C.I. Orange 40, Diaresin Orange K (Mitsubishi Chemical Industries, Ltd.), Diaresin Orange G (Mitsubishi Chemical Industries, Ltd.), Sumiplast Orange 3G (Sumitomo Chemical Co., Ltd.), and the like, red dyes such as C.I. Solvent Red 8, C.I. Solvent Red 81, C.I. Solvent Red 82, C.I. Solvent Red 84, C.I. Solvent Red 100, Cibacron Brilliant Red 38-A (Aldrich Chemical Co.), Drimarene Brilliant Red E-6A (Pylam, Inc.), Acid Red 92, Reactive red 31 (ICI America), and the like, pink dyes such as Diaresin Pink M (Mitsubishi Chemical Industries, Ltd.), Sumiplast Pink RFF (Sumitomo Chemical Co.), Direct Brill Pink B Ground Crude (Crompton & Knowles), and the like, violet dyes such as C.I. Solvent Violet 8, C.I. Solvent Violet 21, Diaresin Violet (Mitsubishi), Diaresin Violet D, Sumiplast Violet RR (Sumitomo), and the like, blue dyes such as C.I. Solvent Blue 2, C.I. Solvent Blue 11, C.I. Solvent Blue 25, C.I. Solvent Blue 36, C.I. Solvent Blue 55, and the like, green yes such as C.I. Solvent Green 3 and the like, brown dyes such as C.I. Solvent Brown 3 and Diaresin Brown A (Mitsubishi), and the like, black dyes such as C.I. Solvent Black 3, C.I. Solvent Black 5, C.I. Solvent Black 7, C.I. Solvent Black 22, C.I. Solvent Black 27, C.I. Solvent Black 29, Acid Black 123, and the like.

Some of the pigments and dyes are commercially available in convenient dispersions and may be used in the preparation of the ink composition of the present invention. For instance, carbon black is available from Penn Color Inc., Doylestown, Pa., as ACROVERSE™ Dispersion No. 91B188C, which contains carbon black 18.0%, an acrylic resin 22.0%, aqueous ammonia 5.5%, an amine 3.5%, water 46.0%, and isopropanol 5.0%. Rhodamine (Blue Shade) is available as a dispersion containing 40% Rhodamine, and phthalocyanine green is available as a dispersion containing 60% phthalocyanine green. All percentages are by weight of the dispersion.

The pigments suitable for use in the ink of the present invention may have any suitable particle size, preferably an average particle size of from about 0.01 $\mu$m to about 2 $\mu$m, and more preferably an average particle size of from about 0.01 $\mu$m to about 1 $\mu$m.

Any suitable amount of the colorant can be used. The colorant is generally present in the ink composition in an amount required to produce the desired contrast and readability. The colorant is preferably present in an amount of from about 0.1% to about 10% by weight, more preferably in an amount of from about 0.1% to about 5% by weight, and even more preferably in an amount of from about 0.1% to about 2% by weight of the ink composition.

BINDER RESINS

The ink composition of the present invention comprises a binder resin. The binder resin is a film former which upon drying of the ink leaves a film on the colorant. The film thus formed is responsible for fixing the colorant to the substrate. The film, in combination with the wax and other ingredients of the ink composition, also provides the jet printed messages a measure of protection against abrasion.

Any suitable binder resin can be used. Suitable binder resins that can be used in the present invention include water soluble or water dispersible resins. The binder resin may form a true solution or a colloidal suspension that may be used if filterable without substantial separation through a filter having a pore size substantially smaller than the printer capillary tube, for example through a 1 $\mu$m filter.

The binder resin can have any suitable molecular weight. The weight average molecular weight of the binder resin is typically in the range from about 1,500 to about 50,000, preferably in the range from about 5,000 to about 20,000, and more preferably in the range of from about 10,000 to about 15,000.

The binder resin can have any suitable acid number. The acid number of the binder resin is typically in the range of from about 20 to about 500, preferably in the range of from about 100 to about 250, and more preferably in the range from about 200 to about 240. The acid number is expressed in milligrams of KOH required to neutralize one gram of the resin.

The binder resin can have any suitable glass transition temperature. The glass transition temperature of the binder resin is typically in the range of from about 50° C. to about 100° C., preferably in the range of from about 60° C. to about 90° C., and more preferably in the range of from about 65° C. to about 85° C.

Examples of suitable water soluble or dispersible binder resins include acrylic copolymer resins, styrene-maleic anhydride resins, shellac based acrylic resins, polyesters, and combinations thereof.

Water soluble or dispersible acrylic copolymer resins can be made by copolymerizing an unsaturated acid monomer with other monomers such as methyl acrylate, ethyl acrylate, propyl acrylate, butyl acrylate, methyl methacrylate, ethyl methacrylate, propyl methacrylate, butyl methacrylate, hydroxyethyl acrylate, hydroxypropyl acrylate, hydroxybutyl acrylate, hydroxyethyl methacrylate, hydroxypropyl methacrylate, hydroxybutyl methacrylate, and the like, and combinations thereof. Examples of suitable unsaturated acid monomers include acrylic acid, methacrylic acid, maleic acid, fumaric acid, itaconic acid, citraconic acid, cinnamic acid, crotonic acid, styrene sulfonic acid, and the like, and combinations thereof. The unsaturated acid monomer can also be in the form of a carboxylate salt with a suitable cation including sodium, potassium, and ammonium, or in the form of an amide such as acrylamide or methacrylamide, or in the form of an anhydride, for instance, maleic anhydride.

The water soluble or dispersible acrylic resin can also include one or more of a comonomer such as styrene, α-methylstyrene, o, p, and m-chloromethyl styrene, styrene substituted with fluoro, chloro, bromo, iodo, nitro, or amino group, acrylonitrile, or butadiene.

There are several water soluble or dispersible acrylic resins that are commercially available that can be used in the present invention. For example, Rohm & Haas Co. in Philadelphia, Pa., sells RHOPLEX AC-261, which is an acrylic polymer emulsion. Water soluble or dispersible acrylics can also be obtained from S. C. Johnson & Co. in Racine, Wis., which sells the acrylics under the tradename of JONCRYL. Preferred Examples of JONCRYL acrylics are the JONCRYL 555, 586, 678, 680, 682, 683, and 67, which are water solubilized copolymers comprising styrene and acrylic acid. JONCRYL 67 is a preferred binder resin. JONCRYL 67 has a glass transition temperature of 73° C., a molecular weight (Mw) of 12,500, an acid number of 213, and a density of 1.14 g/cc at 25° C. JONCRYL 690 has a molecular weight of (Mw) of 15,500, an acid number of 240, a density of 1.07 g/cc. and a glass transition temperature of 102° C.

Examples of suitable styrene-maleic anhydride resins include styrene-maleic anhydride copolymers. Various styrene-maleic anhydride copolymers are available commercially from Aldrich Chemical Co. in Milwaukee, Wis., as SCRIPSET resins from Monsanto Co. in St. Louis, Mo., and as SMA and SMAH resins from ATOCHEM in Malvern, Pa. Several types of SMA and SMAH resins are available. SMA 1000 is a 1:1 molar styrene-maleic anhydride copolymer having a molecular weight of Mw=5,600 and Mn=1,600, a Tg of 138° C., and an acid number of 480. SMA 2000 is a 2:1 molar styrene-maleic anhydride copolymer having a molecular weight of Mw=7,700 and Mn=1,700, a Tg of 124° C., and an acid number of 350. SMA 3000 is a 3:1 molar styrene-maleic anhydride copolymer having a molecular weight of Mw=10,300 and Mn=1,900, a Tg of 124° C. Ammonium salts of partial esters of styrene-maleic anhydride are available as SMAH resins having a degree of esterification of about 30–50%. For instance, SMA 1440H is the ammonium salt of a partial ester of 1:1 molar styrene-maleic anhydride.

Shellac based acrylic resins can also used as binder resins. Shellac is a naturally occurring resin resulting from the exudates of insects feeding on trees. Shellac has a softening point of 65° C., a melting point of 80° C., specific gravity of 1.15–1.20, an acid number of 65–75, and an iodine value of 18–20. Shellac is modified by polymerizing onto it acrylic monomers which modification improves the solubility and film forming properties of shellac. Shellac modified with acrylic monomers such as hydroxyethyl methacrylate which increase the water solubility are preferred. Acrylic modified shellac is commercially available from Zinchem, Inc., 39 Belmont Avenue, Somerset, N.J. 08875.

Examples of other binder resins will be organic resins as commonly used in ink jet printer ink compositions, and include, for example, silicone resins, rosin esters, polyvinyl esters, ketone resins, urea aldehyde resins, vinyl chloride/vinyl ether or vinyl acetate copolymers, polyamide resins, styrene/maleate resins, polyvinylpyrrolidone resins, vinyl pyrrolidone/vinyl acetate copolymers, polystyrene resins, melamine resins, thermosetting acrylic resins, polyurethane resins, and radiation curable acrylate resins.

The binder resin can be present in the jet ink composition in an amount sufficient to provide good adhesion of the images to the substrates. The resin is generally present in the jet ink composition in an amount of from about 1% by weight to about 40% by weight of the composition, preferably in an amount of from about 2% by weight to about 20% by weight of the composition, and more preferably in an amount of from about 5% by weight to about 10% by weight of the ink composition. Excessive use of the resin may increase the viscosity of the ink composition which may lead to poor printing operation and poor quality of the printed message such as smearing.

WAXES

The jet ink composition of the present invention comprises one or more waxes. Any suitable wax can be used, preferably a wax which can be emulsified, suspended, otherwise dispersible in an aqueous medium. The wax can have any suitable melting point. The melting point can be as high as 350° C., preferably between about 50° C. and 330° C., and more preferably between 115° C. and 330° C.

Waxes of many types are well known and include insect and animal waxes such as beeswax and spermaceti; vegetable waxes such as candelilla wax, carnauba wax, Japan wax, ouricury wax, Douglas-fir bark wax, rice-bran wax, jojoba wax, castor wax and bayberry wax; mineral waxes such as Montan wax, peat waxes, Ozokerite wax, Ceresin wax, and petroleum waxes which could be paraffin, semimico-crystalline, and microcrystalline type; and synthetic waxes such as polyethylene waxes, Fisher-Tropsch waxes, chemically modified hydrocarbon waxes, and saturated amine waxes. See *Kirk-Othmer Encyclopedia of Chemical Technology*, "Waxes", 24, p. 466–481, $3^{rd}$ Ed. (1984).

Preferred waxes include emulsifiable polyolefin waxes, paraffin waxes, and polyolefin/paraffin waxes. Examples of polyolefin waxes include waxes made of olefins such as ethylene, propylene, and butylene, and copolymers thereof.

The olefins can be further substituted with one or more halogens including fluorine and chlorine. Thus, for example, polyethylene, polypropylene, or polytetrafluoroethylene waxes can be employed.

Further examples of waxes that may be used in the ink composition of the present invention include the waxes sold by S. C. Johnson Company in Racine, Wis. Examples of such waxes include JONWAX™ 22, JONWAX 26, JONWAX 28, JONWAX 39, JONWAX 120. JONWAX 22 is a microcrystalline wax emulsion having a solids content of about 34% by weight and a density of 0.94 g/cc. gram per cc. JONWAX 26 is a polyethylene wax emulsion having a solids content of about 28% by weight and a density of 0.98 g/cc. JONWAX 28 is a polyethylene wax emulsion having a solids content of about 34% by weight and a density of 0.99 g/cc. JONWAX 39 is polypropylene wax emulsion having a solids content of about 40% by weight and a density of 0.99 g/cc. JONWAX 120 is a polyethylene/paraffin wax emulsion having a density of 0.97 g/cc. These emulsions also contain one or more anionic surfactants such as the fatty acid salts.

Another example of a suitable wax material is the fluoropolymer wax such as a fluoroethylene wax. An example of such a fluoropolymer is polytetrafluoroethylene (PTFE). A preferred polytrafloroethylene wax is a low molecular weight PTFE wax. One such low molecular weight PTFE wax is sold by DuPont Corporation, under the tradename TEFLON™ TE-3667N, which is a negatively charged hydrophobic colloid containing approximately 60% by total weight of 0.05 to 0.5 $\mu$m PTFE resin particles suspended in water. TEFLON TE-3667N also contains approximately 6% by weight of PTFE, of a nonionic wetting agent and a stabilizer which is the ammonium salt of perfluoro octanoate. TEFLON TE-3667N has a peak melting point of about 327° C. and an average particle diameter of 0.2 $\mu$m.

Other examples of waxes which may be used in the present invention also include Refined Karagami wax from Concord, Concord Premium Wax SE microemulsion, Diamond Shamrock Chlorowax 40 liquid chlorinated paraffin, polyethylene waxes from Hoechst, for example, type PE-130, PE-190 and Ceridust 3620; beeswax (NF grade, m.p. 62°–65° C.; Japan Wax NJ-2 (Natural wax, m.p. 48°–54° C.) from Astor Wax Corporation; Concord waxes, for example, Concord SE Premium wax (self emulsified, m.p. 85.5° C.), Refined Concord Wax #407 (m.p. 86° C.), #159 (m.p. 84° C.), #190 (m.p. 90° C.), #1600 (m.p. 84.5° C.), Concord Cowax (m.p. 84° C.), and specialty waxes such as Concord microcrystalline wax #100 (m.p. 86° C.), Concord Wax WS-1027 (m.p. 61° C.), Concord Wax #5000 (m.p. 101.5° C.) and Concord Beeswax Substitute (m.p. 79.5° C.). Other suitable waxes include Refined Montan Wax (drop point (d.p.) 82°–88° C.); acid waxes with a drop point of 81°–87° C., waxes such as Hoechst Wachs LP, UL and FW; ester waxes such as Hoechst Wachs E (d.p. 79°–85° C.), X-22 (d.p. 78°–86° C.), F (d.p. 77°–83° C.), KP (d.p. 81°–87° C.), KP 302 (d.p. 86°–92° C.), KPF (d.p. 80°–85° C.), KSL (d.p. 80°–85° C.), KSS (d.p. 82°–88° C.), KFO (d.p. 85°–91° C.) and KFT (d.p. 55°–62° C.); ester waxes containing emulsifier such as Hoechst Wachs KPE (d.p. 79°–85° C.), KSE (d.p. 82°–88° C.), KLE (d.p. 82°–88° C.) and DPEneu (d.p. 79°–85° C.); polar and nonpolar polyethylene wax (m.p. about 110°–130° C.); and other similar waxes.

When the wax is not available in emulsified form, it can be converted to an emulsion by methods known to those skilled in the art, for example, by the use of suitable surfactants. The surfactant can be anionic, cationic, non-ionic, or amphoteric, or combinations thereof. The type and amount of surfactant necessary to emulsify the wax will depend on a variety of factors known to those of ordinary skill in the art, including the polar/nonpolar or hydrophilic/hydrophic nature of the wax. The surfactants suitable for emulsifying a wax can be selected from their hydrophile-lipophile balance (HLB) values which are available in the literature. See, e.g., *Kirk-Othmer Encyclopedia of Chemical Technology*, "Emulsions", 8, p. 900–930, $3^{rd}$ Ed. (1979). Thus, for example, polyethylene wax can be emulsified as an oil/water emulsion using a surfactant having a HLB value of about 15, a paraffin wax can be emulsified as an oil/water emulsion using a surfactant having a HLB value of about 10, and Ceresine wax can be emulsified as an oil/water emulsion using a surfactant having a HLB value of about 8.

A surfactant having a HLB value of up to about 40, preferably a surfactant having a HLB value of from about 5 to about 20, and more preferably a surfactant having a HLB value of from about 7 to about 16, can be used to prepare emulsions of a suitable wax.

While not intending to be bound to any particular theory, it is believed that the wax lowers the surface friction of the images and that the lowered surface friction is at least in part responsible for the increase in durability, particularly the rub resistance and the scratch resistance of the printed images.

Any suitable amount of the wax can be used in the jet ink composition of the present invention. For example, the wax can be present in an amount of from about 0.01% to about 30% by weight of the ink composition, preferably in an amount of from about 1% to about 10% by weight, and more preferably in an amount of from about 2% to about 5% by weight of an amount of from about 2% to about 5% by weight of the jet ink composition.

For example, the JONWAX brand wax emulsions or the TEFLON TE-3667N suspension can be used in an amount of from about 0.1% to about 50% by weight of the jet ink composition, preferably in an amount of from about 1% to about 20% by weight of the jet ink composition, and more preferably in an amount of from about 5% to about 10% by weight of the jet ink composition.

ORGANIC SOLVENTS

The ink composition of the present invention can further include one or more organic solvents to increase the solubility or the dispersibility of the resin or the colorant. Any suitable organic solvent can be used. Examples of suitable classes of organic solvents include the polar solvents such as amides, esters, ketones, lactones, and ethers, and preferred solvents have high boiling points. The boiling point of the solvent is preferably higher than 100° C. and more preferably higher than 150° C. Examples of suitable organic solvents thus include N-methylpyrrolidone (NMP), dimethyl sulfoxide, sulfolane, and glycol ethers. NMP is a preferred solvent.

Examples of glycol ethers include the mono- and di-alkyl ethers of alkylene glycols in which the alkyl group contains 1–6 carbon atoms (e.g., methyl, ethyl, propyl, butyl, etc.) and the alkylene glycol has 2–6 carbon atoms. Examples of suitable monoalkyl alkylene glycol ethers include ethylene glycol methyl ether, ethylene glycol ethyl ether, ethylene glycol butyl ether, ethylene glycol hexyl ether, diethylene glycol methyl ether, diethylene glycol ethyl ether, diethylene glycol butyl ether, propylene glycol methyl ether, dipropylene glycol methyl ether, tripropylene glycol methyl ether, triethylene glycol ethyl ether, triethylene glycol methyl ether, and the like.

The organic solvent is preferably used in small amounts in view of this environmental concerns. The organic solvent is typically used in an amount that is below about 20% by weight of the ink composition, preferably in an amount of from about 0.1% by weight to about 10% by weight of the ink composition, and more preferably in an amount of from about 1% weight to about 5% by weight of the ink composition.

HUMECTANTS

The jet ink composition of the present invention can include one or more humectants to prevent the ink from drying out at the jet tip. Any suitable humectant can be used. Examples of suitable humectants include aliphatic polyols such as diols, triols, and other polyhydroxy compounds. Examples of suitable polyols include alkylene glycols in which the alkylene group preferably contains 3–6 carbon atoms, as represented by propylene glycol, butylene glycol, hexylene glycol, glycerin, and the like, and combinations thereof. Propylene glycol is a further preferred humectant. Although ethylene glycol can serve as a humectant, its use should be restricted in view of its toxicity.

Other suitable examples of humectants include polyalkylene glycols such as diethylene glycol, dipropylene glycol, triethylene glycol, tripropylene glycol, tetraethylene glycol, and polyethylene glycol, and combinations thereof. Examples of suitable commercially available polyalkylene glycols include Carbowax 200 and Carbowax 400, which have average molecular weights of about 200 and 400, respectively. Polyalkylene glycols of any suitable average molecular weight can be used, and preferably those having an average molecular weight of less than 600, since higher molecular weight polyalkylene glycols frequently serve to undesirably increase the viscosity of the ink composition.

As will be appreciated by those skilled in the art, the amount of the humectant component employed will depend to some extent on the molecular weight of the polyol employed, the efficacy generally decreasing with increasing molecular weight.

Any suitable amount of the humectant can be used. The humectant is preferably used in an amount of from about 2% to about 7% by weight, and more preferably in an amount of from about 2% to about 4% by weight of the ink composition. Excessive amount of the humectant will unfavorably increase the viscosity of the composition.

BIOCIDES

The jet ink composition of the present invention can include one or more biocides to prevent the growth of bacteria, mould, or fungus. Any suitable biocide can be employed. Methyl p-hydroxybenzoate (METHYL PARABEN) and 6-acetoxy-2,2-dimethyl-1,3-dioxane (available as GIV GARD DXN™ from Givaudam Corp.) are suitable biocides, with the latter being a preferred biocide.

Any suitable amount of a biocide can be used. The biocide is generally present in the jet ink composition of the present invention in an amount sufficient to prevent the attack by bacteria, mould, or fungus. The biocide is generally present in an amount of from about 0.0% by weight to about 5% by weight of the composition, and preferably in an amount of from about 0.1% by weight to about 0.2% by weight of the jet ink composition.

CONDUCTIVITY AGENTS

Jet printing ink compositions, for best results, should have a low specific resistivity, such as within the range of about 50 to about 2000 ohm-cm. Aqueous jet ink compositions generally possess the required electrical resistivity due the presence of basic ingredients such as ammonium hydroxide used to neutralize the acidic binder resins. If needed, the desired conductivity can be achieved by the addition of an ionizable material. Examples of such ionizable materials include ammonium, alkali, and alkaline earth metal salts such as ammonium hydroxide, lithium nitrate, lithium chloride, lithium thiocyanate, lithium trifluoromethanesulfonate, sodium chloride, potassium chloride, potassium bromide, calcium chloride, and the like, dimethylamine hydrochloride, and hydroxylamine hydrochloride. Any suitable amount of the ionizable material can be used. Normally, an ionizable material content of up to about 2% provides the desired conductivity.

DEFOAMERS

The ink composition of the present invention may preferably comprise a defoamer to prevent foaming of the ink during its preparation, as well as during the printing operation. Any suitable defoamer known to those of ordinary skill in the art can be used, preferably those that are miscible with water. Suitable defoamers include silicone defoamers and acetylenic defoamers.

Examples of commercially available defoamers include silicone defoamers, such as DC-150, which can be obtained from Dow Corning Co., and SILVET I-77, 720, 722, or 7002, which can be obtained from Union Carbide Co. A preferred defoamer is XRM-3588E™, which can be obtained from Ultra Additives Inc., in Paterson, N.J. XRM-3588E is a defoamer generally used in metal cutting fluids, and has a Brookfield (RVF Spindle #4, 20 RPM, 25° C.) viscosity of 6,000 to 9,000 cps, a specific gravity of 0.984–1.032, and a pH of 7.0–8.5 (50% solution). The chemistry of XRM-3588E has not been published, and is believed to be a silicone defoamer.

Examples of acetylenic defoamers include the SURFYNOL™ brand defoamers which can be obtained from Air Products and Chemical Co. in Allentown, Pa. A number of SURFYNOL defoamers are available, including the preferred SURFYNOL 104 (2,4,7,9-tetramethyl-5-decyn-4,7-diol), which is available as a solution in a variety of solvents as SURFYNOL 104A, SURFYNOL 104E, SURFYNOL 104H, and SURFYNOL 104BC, and other SURFYNOLs such as SURFYNOL GA, SURFYNOL SE, SURFYNOL TG, SURFYNOL PC, the dimethyl hexynediol, SURFYNOL 61, the dimethyl octynediol, SURFYNOL 82, the ethoxylated derivatives of the tetramethyl decynediol, SURFYNOL 440, SURFYNOL 465, and SURFYNOL 485, all of which can be used in the instant invention.

The defoamer can be used in any suitable amount. The defoamer is generally used in an amount of from about 0.01% to about 5% by weight of the jet ink composition, preferably in an amount of from about 0.05% to about 1% by weight of the jet ink composition, and more preferably in an amount of from about 0.05% to about 0.5% by weight of the jet ink composition.

VISCOSITY

It is essential to the practice of the present invention that the ink compositions have a viscosity within the range of about 1.0 to about 10 cps, and preferably about 1.0 to about 7.0 cps, as measured at 25° C., in order to achieve the desired rheological characteristics. As indicated above, the viscosity of the ink composition of the invention is conveniently regulated, as known to those of ordinary skill in the art, for instance, by suitable choice of the quantity and the molecular weight of the binder resin, the organic solvent, the wax, and other additives.

pH ADJUSTING AGENTS

If needed, the jet ink composition can include a pH adjusting agent such as a base to insure that the binder resin remains soluble or dispersible in the aqueous carrier. For this purpose, it is desirable to maintain the pH of the ink at about 7.0 to about 10.5, preferably in the range of about 7.0 to about 10.0. The desired pH will be dependent upon the particular resin, and as known to those of ordinary skill in the art, to some extent upon the other components employed. Although use can be made of inorganic bases such as sodium hydroxide and potassium hydroxide, their presence in the printed message could lead to poor water resistance after drying. It is preferred therefore, to make use of an organic base which can be eliminated by evaporation. Best use is made of a pH adjusting agent that evaporates rapidly to accelerate development of water resistance upon aging. Thus, while use can be made of organic amines, it is preferable to make use of ammonium hydroxide for controlling the pH within the desired range. Morpholine can also be used for long term stability during storage of the ink composition.

Any suitable amount of the pH adjusting agent can be used. Generally, the pH adjusting agent is used in an amount of from about 0.1% by weight to about 1% by weight, and preferably in an amount of from about 0.3% by weight to about 0.7% by weight of the composition. Excessive use of the agent may adversely affect the print quality, and also raise environmental concerns.

All percentages expressed herein are by weight based on the total weight of the ink composition of the present invention, unless otherwise indicated.

The following examples further illustrate the present invention but, of course, should not be construed as in any way limiting its scope.

EXAMPLE 1

This Example illustrates the preparation of the inventive jet ink composition as well as the advantages of the inventive jet ink composition over certain previously known inks.

An embodiment of the inventive jet ink composition was prepared by combining the ingredients set forth below and mixing them by continuous stirring until a smooth composition was obtained.

| Ingredients | wt % |
| --- | --- |
| Deionized water | 41.2 |
| JONCRYL 67 solution (20% aqueous, neutralized with ammonium hydroxide from S.C. Johnson) | 40.0 |
| N-methyl-2-Pyrrolidone (ISP Technologies) | 1.5 |
| GIV-GUARD DXN (Givaudan-Roure) | 0.2 |
| XRM Defoamer-3588E (Ultra Additives) | 0.1 |
| Carbon Black 91B188C acrylic paste (Penn Color) | 9.0 |
| TEFLON TE-3667N (Dupont) | 8.0 |
| | 100.0 |

The jet ink composition was printed on glass, tin, aluminum, low density polyethylene (LDPE), high density polyethylene (HDPE), polypropylene, and PTFE sheets. The images were tested for scratch resistance and rub resistance.

The finger nail scratch resistance was tested by scratching the print 10 times using a finger nail in a downward stroke with light medium pressure. The rub resistance was tested by rubbing 10 times the print using a clean thumb unidirectionally across the print with medium pressure.

A control ink composition was prepared using the above ingredients minus TEFLON TE-3667N. The control ink composition was used to jet print images on the above substrates. The finger nail scratch resistance and finger rub resistance were tested.

It was found that the prints from the control ink composition had acceptable finger rub resistance on all of the above substrates except TEFLON. The prints from the inventive ink composition, on the other hand, had excellent finger rub resistance on all substrates including the difficult to print HDPE and polypropylene substrates. The inventive ink composition offered improved finger nail scratch resistance over the control ink composition on all substrates.

EXAMPLE 2

This Example illustrates the preparation of another embodiment of the inventive jet ink composition.

Another embodiment of the inventive jet ink composition was prepared by combining the ingredients set forth below and mixing them by continuous stirring until a smooth composition was obtained.

| Ingredients | wt % |
| --- | --- |
| Deionized water | 36.2 |
| JONCRYL 67 solution (20% aqueous, neutralized with ammonium hydroxide) | 40.0 |
| N-methyl-2-Pyrrolidone (ISP Technologies) | 1.5 |
| GIV GARD DXN (Givaudan-Roure) | 0.2 |
| XRM Defoamer-3588E (Ultra Additives) | 0.1 |
| Carbon Black 91B188C acrylic paste (Penn Color) | 9.0 |
| JONWAX 26 (S.C. Johnson) | 13.0 |
| | 100.0 |

The jet ink composition was printed on glass, tin, aluminum, LDPE, HDPE, polypropylene, and PTFE surfaces. The images were tested for scratch resistance and rub resistance as set forth in Example 1. The printed images had improved finger nail scratch resistance and finger rub resistance.

EXAMPLE 3

This Example illustrates the preparation of another embodiment of the inventive jet ink composition.

Yet another embodiment of the inventive jet ink composition was prepared by combining the ingredients set forth below and mixing them by continuous stirring until a smooth composition was obtained.

| Ingredients | wt % |
| --- | --- |
| Deionized water | 39.2 |
| JONCRYL 67 solution (20% aqueous, neutralized with ammonium hydroxide, S.C. Johnson Co.) | 40.0 |
| N-methyl-2-Pyrrolidone (ISP Technologies) | 1.5 |
| GIV GARD DXN (Givaudan-Roure) | 0.2 |
| XRM Defoamer-3588E (Ultra Additives) | 0.1 |
| Carbon Black 91B188C acrylic paste (Penn Color) | 9.0 |
| JONWAX 28 (S.C. Johnson) | 10.0 |
| | 100.0 |

The jet ink composition was printed on glass, tin, aluminum, LDPE, HDPE, polypropylene, and PTFE surfaces. The images were tested for scratch resistance and rub resistance as set forth in Example 1. The printed images had improved finger nail scratch resistance and finger rub resistance.

The present invention further provides a jet ink composition as set forth above wherein the binder resin is present in an amount of from about 1% to about 40% by weight of the jet ink composition, the organic solvent is present in an amount of from about 0.1% to about 10% by weight of the jet ink composition, the colorant is present in an amount of from about 0.1% to about 10% by weight of the jet ink composition, the wax is present in an amount of from about 0.3% to about 30% by weight of the jet ink composition, and the defoamer is present in an amount of from about 0.01% to about 5% by weight of the jet ink composition.

The present invention further provides a process for printing on substrates identifying marks that are scratch and rub resistant comprising jet printing onto the substrates using a jet ink composition as described above and drying the identifying marks. The marks can be dried by any method known to those skilled in the art including by heating, e.g., by the use of an IR lamp.

The present invention further provides identifying marks produced by the process of printing described above.

The present invention also provides a process for preparing a jet ink composition suitable for printing scratch and rub resistant identifying marks on paper, glass, metal, or plastic substrates, comprising combining and mixing water, a colorant, a binder resin, and a wax.

All of the references, including patents and publications, cited herein are hereby incorporated in their entireties by reference.

While this invention has been described with an emphasis upon the preferred embodiment, it will be obvious to those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

What is claimed is:

1. A jet ink composition suitable for jet printing on paper, glass, metal, or plastic surfaces messages having scratch resistance and rub resistance comprising water, a colorant, a binder resin, and a polytetrafluoroethylene wax.

2. The jet ink composition of claim 1, wherein said composition has a Brookfield viscosity of from about 1.8 cps to about 7.0 cps at 25° C., an electrical resistivity of from about 20 ohm-cm to about 2,000 ohm-cm, and a sonic velocity of from about 1200 meters/second to about 1700 meters/second.

3. The jet ink composition of claim 2, wherein said colorant is a pigment.

4. The jet ink composition of claim 3, wherein said pigment has a particle size of from about 0.01 μm to about 1 μm.

5. The jet ink composition of claim 4, wherein said pigment is carbon black.

6. A process for printing on substrates identifying marks that are scratch and rub resistant comprising jet printing onto said substrates using a jet ink composition of claim 2 and drying said identifying marks.

7. The process of claim 6, wherein said substrate is selected from the group consisting of glass, metal, and plastic.

8. The process of claim 7, wherein said metal substrate is tin or aluminum.

9. The process of claim 7, wherein said plastic substrate is a polyolefin substrate.

10. The process of claim 9, wherein said polyolefin is selected from the group consisting of low density polyethylene, high density polyethylene, polypropylene, and polytetrafluoroethylene.

11. The process of claim 10, wherein said polyolefin is selected from the group consisting of high density polyethylene and polytetrafluoroethylene.

12. The identifying mark produced by the process of claim 6.

13. A process for preparing a jet ink composition suitable for jet printing on paper, glass, metal, or plastic surfaces messages having scratch resistance and rub resistance comprising combining and mixing water, a colorant, a binder resin, and a polytetrafluoroethylene wax.

14. The process of claim 13, wherein said jet ink composition has a Brookfield viscosity of from about 1.8 cps to about 7.0 cps at 25° C., an electrical resistivity of from about 20 ohm-cm to about 2,000 ohm-cm, and a sonic velocity of from about 1200 meters/second to about 1700 meters/second.

15. The process of claim 14, wherein said colorant is a pigment.

16. The process of claim 15, wherein said pigment has a particle size of from about 0.01 μm to about 1 μm.

17. The process of claim 15, wherein said pigment is carbon black.

18. A jet ink composition suitable for jet printing on paper, glass, metal, or plastic surfaces messages having scratch resistance and rub resistance comprising water, a colorant, an acrylic copolymer, and a wax.

19. The jet ink composition of claim 18, wherein said acrylic copolymer is a styrene-acrylic copolymer.

20. The jet ink composition of claim 19, wherein said styrene-acrylic copolymer has a glass transition temperature of from about 50° C. to about 105° C.

21. The jet ink composition of claim 20, wherein said styrene-acrylic copolymer has an acid number of from about 100 to about 250.

22. The jet ink composition of claim 21, wherein said styrene-acrylic copolymer has an acid number of from about 200 to about 240.

23. The jet ink composition of claim 22, wherein said wax has a melting point of from about 130° C. to about 330° C.

24. The jet ink composition of claim 23, wherein said wax has a melting point of from about 300° C. to about 330° C.

25. The jet ink composition of claim 24, wherein said wax is a polyhaloolefin wax.

26. The jet ink composition of claim 25, wherein said polyhaloolefin wax is a polytetrafluoroethylene wax.

27. The jet ink composition of claim 26, further comprising an organic solvent.

28. The jet ink composition of claim 27, wherein said organic solvent is N-methylpyrrolidone.

29. The jet ink composition of claim 28, further comprising a defoamer.

30. The jet ink composition of claim 29, wherein said defoamer is a silicone defoamer.

31. The jet ink composition of claim 30, wherein said styrene-acrylic resin is present in an amount of from about 1% to about 40% by weight of said jet ink composition, said organic solvent is present in an amount of from about 0.1% to about 10% by weight of said jet ink composition, said pigment is present in an amount of from about 0.1% to about 10% by weight of said jet ink composition, said wax is present in an amount of from about 0.3% to about 30% by weight of said jet ink composition, and said defoamer is present in an amount of from about 0.01% to about 5% by weight of said jet ink composition.

32. The jet ink composition of claim 31, further comprising a biocide.

33. The jet ink composition of claim 23, wherein said wax has a melting point of from about 130° C. to about 150° C.

34. The jet ink composition of claim 33, wherein said wax comprises a polyolefin wax or a paraffin wax.

35. The jet ink composition of claim 34, wherein said wax has a particle size of from about 0.05 μm to about 0.075 μm.

36. The jet ink composition of claim 34, wherein said wax is a polyolefin wax.

37. The jet ink composition of claim 36, wherein said wax is a polyethylene wax.

38. The jet ink composition of claim 37, further comprising an organic solvent.

39. The jet ink composition of claim 38, wherein said organic solvent is N-methylpyrrolidone.

40. The jet ink composition of claim 39, further comprising a defoamer.

41. The jet ink composition of claim 40, wherein said defoamer is a silicone defoamer.

42. The jet ink composition of claim 41, wherein said styrene-acrylic resin is present in an amount of from about 1% to about 40% by weight of said jet ink composition, said organic solvent is present in an amount of from about 0.1% to about 10% by weight of said jet ink composition, said pigment is present in an amount of from about 0.1% to about 10% by weight of said jet ink composition, said wax is present in an amount of from about 0.3% to about 30% by weight of said jet ink composition, and said defoamer is present in an amount of from about 0.01% to about 5% by weight of said jet ink composition.

43. The jet ink composition of claim 42, further comprising a biocide.

44. A process for printing on substrates identifying marks that are scratch and rub resistant comprising jet printing onto said substrates using the jet ink composition of claim 23 and drying said identifying marks.

45. The process of claim 44, wherein said substrate is selected from the group consisting of glass, metal, and plastic.

46. The process of claim 45, wherein said metal substrate is tin or aluminum.

47. The process of claim 45, wherein said plastic substrate is a polyolefin substrate.

48. The process of claim 47, wherein said polyolefin is selected from the group consisting of low density polyethylene, high density polyethylene, polypropylene, and polytetrafluoroethylene.

49. The process of claim 48, wherein said polyolefin is selected from the group consisting of high density polyethylene and polytetrafluoroethylene.

50. A process for printing on substrates identifying marks that are scratch and rub resistant comprising jet printing onto said substrates using the jet ink composition of claim 31 and drying said identifying marks.

51. The process of claim 50, wherein said substrate is selected from the group consisting of paper, glass, metal, and plastic.

52. The process of claim 51, wherein said metal substrate is tin or aluminum.

53. The process of claim 51, wherein said plastic substrate is a polyolefin substrate.

54. The process of claim 53, wherein said polyolefin is selected from the group consisting of low density polyethylene, high density polyethylene, polypropylene, and polytetrafluoroethylene.

55. The process of claim 54, wherein said polyolefin is selected from the group consisting of high density polyethylene and polytetrafluoroethylene.

56. A process for printing on substrates identifying marks that are scratch and rub resistant comprising jet printing onto said substrates using the jet ink composition of claim 37 and drying said identifying marks.

57. The process of claim 56, wherein said substrate is selected from the group consisting of paper, glass, metal, and plastic.

58. The process of claim 57, wherein said metal substrate is tin or aluminum.

59. The process of claim 57, wherein said plastic substrate is a polyolefin substrate.

60. The process of claim 59, wherein said polyolefin is selected from the group consisting of low density polyethylene, high density polyethylene, polypropylene, and polytetrafluoroethylene.

61. The process of claim 60, wherein said polyolefin is selected from the group consisting of high density polyethylene and polytetrafluoroethylene.

62. The identifying mark produced by the process of claim 44.

63. The identifying mark produced by the process of claim 50.

64. The identifying mark produced by the process of claim 56.

65. The process of claim 17, wherein said binder resin is an acrylic copolymer.

66. The process of claim 65, wherein said wax is selected from the group consisting of polyethylene wax, polytetrafluoroethylene wax, and combinations thereof.

* * * * *